US010867636B2

(12) United States Patent
Sangoli et al.

(10) Patent No.: US 10,867,636 B2
(45) Date of Patent: Dec. 15, 2020

(54) INTERACTIVE VIDEO PROGRESS BAR USING A MARKUP LANGUAGE

(71) Applicant: BANK OF AMERICA CORPORATION, Charlotte, NC (US)

(72) Inventors: Shankar Sangoli, Langhorne, PA (US); Yacine Arbani, Dublin, PA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/579,332

(22) Filed: Sep. 23, 2019

(65) Prior Publication Data

US 2020/0118597 A1    Apr. 16, 2020

Related U.S. Application Data

(63) Continuation of application No. 16/156,579, filed on Oct. 10, 2018, now Pat. No. 10,460,766.

(51) Int. Cl.
*G11B 27/34* (2006.01)
*G06F 16/74* (2019.01)

(52) U.S. Cl.
CPC ............ *G11B 27/34* (2013.01); *G06F 16/745* (2019.01)

(58) Field of Classification Search
CPC ..... G11B 27/34; G06F 16/745; G06F 16/748; H04N 21/8456; H04N 21/816; H04N 21/4782; H04N 21/8545
USPC .......................................................... 386/240
See application file for complete search history.

(56) References Cited

U.S. PATENT DOCUMENTS

| | | | |
|---|---|---|---|
| 6,173,317 B1 | 1/2001 | Chaddha et al. | |
| 7,739,280 B2 | 6/2010 | Aravamudan et al. | |
| 9,325,946 B2 | 4/2016 | Tanaka et al. | |
| 9,532,116 B2 | 12/2016 | Terpe | |
| 2004/0220926 A1* | 11/2004 | Lamkin .................. | G06F 21/10 |
| 2005/0047754 A1* | 3/2005 | Jung .................. | G11B 27/3027 |
| | | | 386/240 |
| 2007/0005795 A1 | 1/2007 | Gonzalez | |
| 2008/0165148 A1 | 7/2008 | Williamson et al. | |
| 2009/0138906 A1 | 5/2009 | Eide et al. | |

(Continued)

OTHER PUBLICATIONS

Long, M. C., "Interactive Video: The New Content Marketing Must-Have," https://www.adweek.com/digital/interactive-video/, Aug. 31, 2015, 6 pages.

*Primary Examiner* — Helen Shibru
(74) *Attorney, Agent, or Firm* — Michael A. Springs (57) ABSTRACT

A device that includes a playback engine configured to receive a video request that includes source scene information for a set of video scenes and animation instructions. The playback engine is configured to assign source scene identifiers for each video scene and to assign animation identifiers to elements in the video scenes. The playback engine is configured to generate a scene timing map that links a source scene identifier with an animation identifier and a time duration for the animation identifier. The playback engine is configured to generate a video timing map that includes a set of timestamp entries that each reference a source scene identifier and an animation identifier in the scene timing map. The playback engine is configured to link a progress bar with the video timing map and to display the progress bar with a video scene that is generated based on the source scene information.

12 Claims, 6 Drawing Sheets

(56) References Cited

U.S. PATENT DOCUMENTS

| | | | |
|---|---|---|---|
| 2009/0276805 A1* | 11/2009 | Andrews, II | H04N 21/2547 725/35 |
| 2011/0262103 A1* | 10/2011 | Ramachandran | H04N 21/4622 386/240 |
| 2012/0084807 A1 | 4/2012 | Thompson et al. | |
| 2012/0131454 A1 | 5/2012 | Shah | |
| 2012/0236201 A1* | 9/2012 | Larsen | H04N 21/439 348/468 |
| 2013/0091519 A1 | 4/2013 | McLauchlan et al. | |
| 2014/0186010 A1 | 7/2014 | Guckenberger et al. | |
| 2014/0199045 A1* | 7/2014 | Lee | G11B 27/034 386/240 |
| 2016/0103830 A1* | 4/2016 | Cheong | G06F 3/0484 715/738 |
| 2018/0316948 A1 | 11/2018 | Todd | |

* cited by examiner

Source scene ID 134

Source Scene 132

```
Source scene ID
{
  metadata: {
    HTML: 'HTML string/DOM element/jQuery object',  //HTML instructions    — HTML Instructions 202 animations: [{                                  //animations instructions — Animation Instructions 204
      e: '.element-selector'
      p: {left:'0%'},
      o: {duration: 1000}
    }], audioSource : '',                               //audio source           — Audio Instructions 206 transitions: {                                  //transition effect      — Transition Effect Instructions 208
      enter: {
        effect: 'slideLeft',
        duration: 500
      },
      exit: {
        effect: 'slideUp',
        duration: 500
      }
    }
  }
}
```

FIG. 6

INTERACTIVE VIDEO PROGRESS BAR USING A MARKUP LANGUAGE

CROSS-REFERENCE TO RELATED APPLICATIONS

This application is a continuation of U.S. patent application Ser. No. 16/156,579 filed Oct. 10, 2018, by Shankar Sangoli et al., and entitled "INTERACTIVE VIDEO PROGRESS BAR USING A MARKUP LANGUAGE," which is incorporated herein by reference.

TECHNICAL FIELD

The present disclosure relates generally to creating interactive videos, and more specifically to creating interactive videos using a markup language.

BACKGROUND

A web platform provides a computer network that enables users to access information from multiple sources. However, users typically have to visit multiple areas within the web platforms to gather what is meaningful to them. In existing systems, users do not have the capability to define their own personalized web content and access the web content without being redirected to multiple areas within the web platform. For example, a user may want to trade (e.g., buy or sell) a particular stock on a web platform. The user may go to a first place of the web platform to view statistics such as past performance of the stock, go to a second place of the web platform to check whether the user has enough account balance to trade the stock, and then go to a third place of the web platform to watch a video on how to conduct a trade on the stock. This process is not only inefficient, but it also poses several technical challenges. For example, this process constantly consumes network resources and bandwidth while user visits the multiple locations within the web platform. This process also consumes computing resources to process all the user's requests to visit the multiple locations in the web platform. In addition, this process also significantly increases the time it takes for the user to obtain the meaningful information which degrades the user's satisfaction with the web platform.

SUMMARY

A web platform provides a computer network that enables users to access information from multiple sources. However, users typically have to visit multiple areas within the web platforms to gather what is meaningful to them. In existing systems, users do not have the capability to define their own personalized web content and access the web content without being redirected to multiple areas within the web platform. For example, a user may want to trade (e.g., buy or sell) a particular stock on a web platform. The user may go to a first place of the web platform to view statistics such as past performance of the stock, go to a second place of the web platform to check whether the user has enough account balance to trade the stock, and then go to a third place of the web platform to watch a video on how to conduct a trade on the stock. This process is not only inefficient, but it also poses several technical challenges. For example, this process constantly consumes network resources and bandwidth while user visits the multiple locations within the web platform. This process also consumes computing resources to process all the user's requests to visit the multiple locations in the web platform. In addition, this process also significantly increases the time it takes for the user to obtain the meaningful information which degrades the user's satisfaction with the web platform.

The system disclosed herein provides several technical advantages which include creating an interactive video in the form of a series of HTML pages. Creating a video in the form of a series of HTML pages is an unconventional technique which allows a viewer to interact with HTML links or interactive HTML elements that are embedded in the HTML pages of the video. The interactive video includes interactive HTML elements that allow users to interact with the video. Allowing users to interact with the video facilitates increasing the efficiency of the disclosed system because the users do not need to go to different places (e.g., web pages) or be redirected to find the information they want. Instead, users can stay on and interact with the video to find the information they want. By doing this, users can avoid bouncing around multiple places and the system can avoid reloading or rebuffering the same web pages or content. This conserves network bandwidth and computing resources, such as memories and processing power.

Existing systems usually present a video in the format of MP4, MOV, AVI, among others. Rendering and streaming a video as a series of HTML pages requires less computing resources and network resources than rendering and streaming videos having other formats such as MP4, MOV, and AVI. This facilitates decreasing the loading and buffering time of the web content, reducing response time of the disclosed system, and conserving computing resources and network resources.

Unlike traditional videos where a progress bar has a one-to-one correspondence between time and video frames, an interactive HTML videos may comprise animations, delays, and interactive HTML elements that have different timing characteristics. These elements have variable timing characteristics because these elements may occur sequentially, in parallel, or may even be optional. These variable timing characteristics mean that interactive HTML videos do not follow a linear timeline or have one-to-one correspondence between time and video scenes. The disclosed system is configured to generate progress bar for an interactive HTML video which provides a user interface that links video scenes and other elements in an interactive HTML video.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system disclosed herein provides several technical advantages which include creating an interactive video in the form of a series of HTML pages. Creating a video in the form of a series of HTML pages is an unconventional technique which allows a viewer to interact with HTML links or interactive HTML elements that are embedded in the HTML pages of the video. Existing systems and methods usually present a video in the format of MP4, MOV, AVI, among others. Rendering and streaming a video as a series of HTML pages requires less computing resources and network resources than rendering and streaming videos having other formats such as MP4, MOV, and AVI. This facilitates decreasing the loading and buffering time of the web content, reducing response time of the disclosed system 100, and conserving computing resources and network resources.

Unlike traditional videos where a progress bar has a one-to-one correspondence between time and video frames, an interactive HTML videos may comprise animations 164, delays, and interactive HTML elements that have different timing characteristics. These elements have variable timing characteristics because these elements may occur sequentially, in parallel, or may even be optional. These variable timing characteristics mean that interactive HTML videos do not follow a linear timeline or have one-to-one correspondence between time and video scenes. The disclosed system is configured to generate progress bar for an interactive HTML video. The progress bar provides a user interface that links video scenes and other elements in an interactive HTML video.

Figure 1:
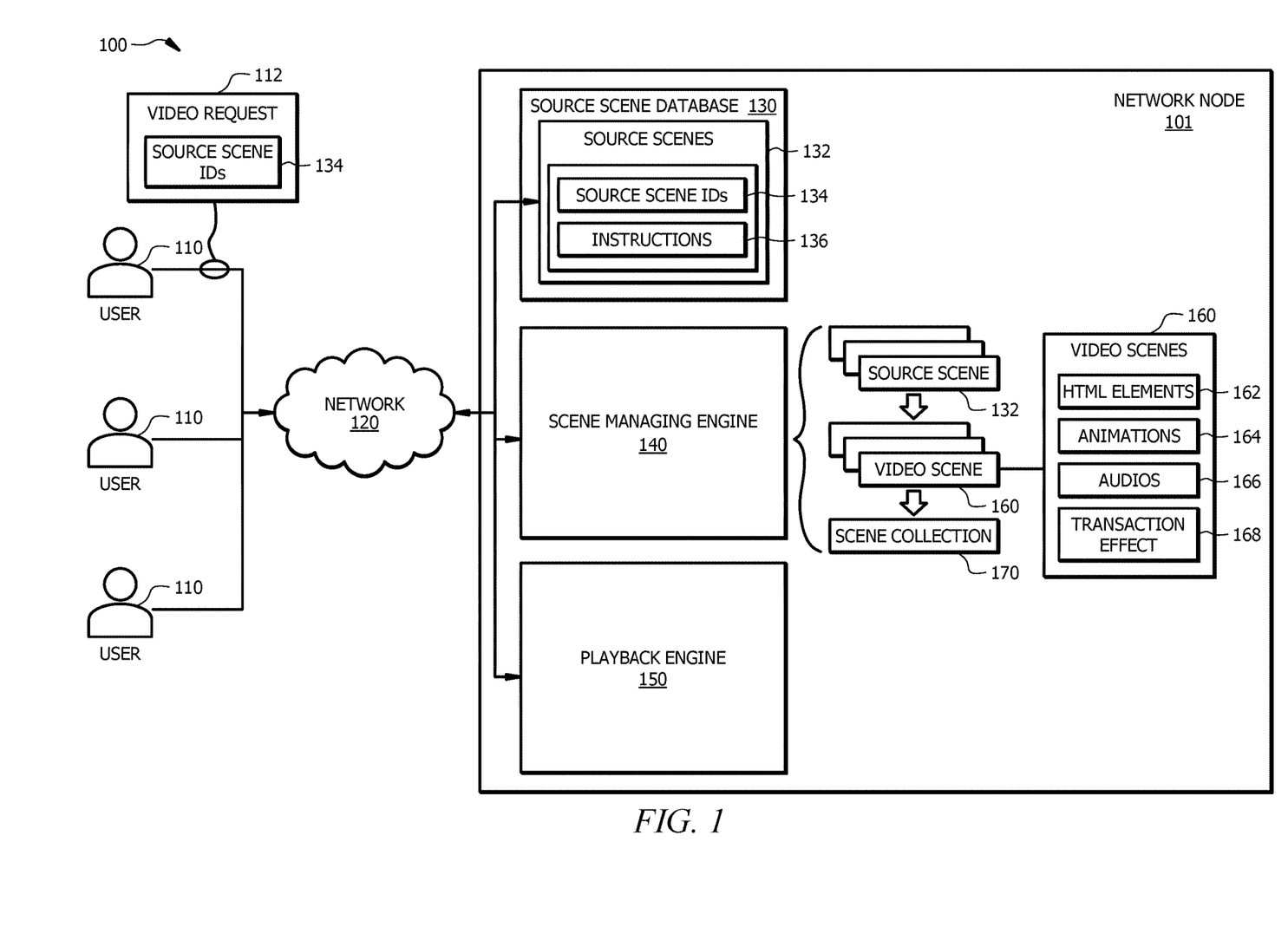
FIG. 1 is a schematic diagram of an embodiment of a system for creating an interactive video using a markup language according to the present disclosure.
Figure 2:
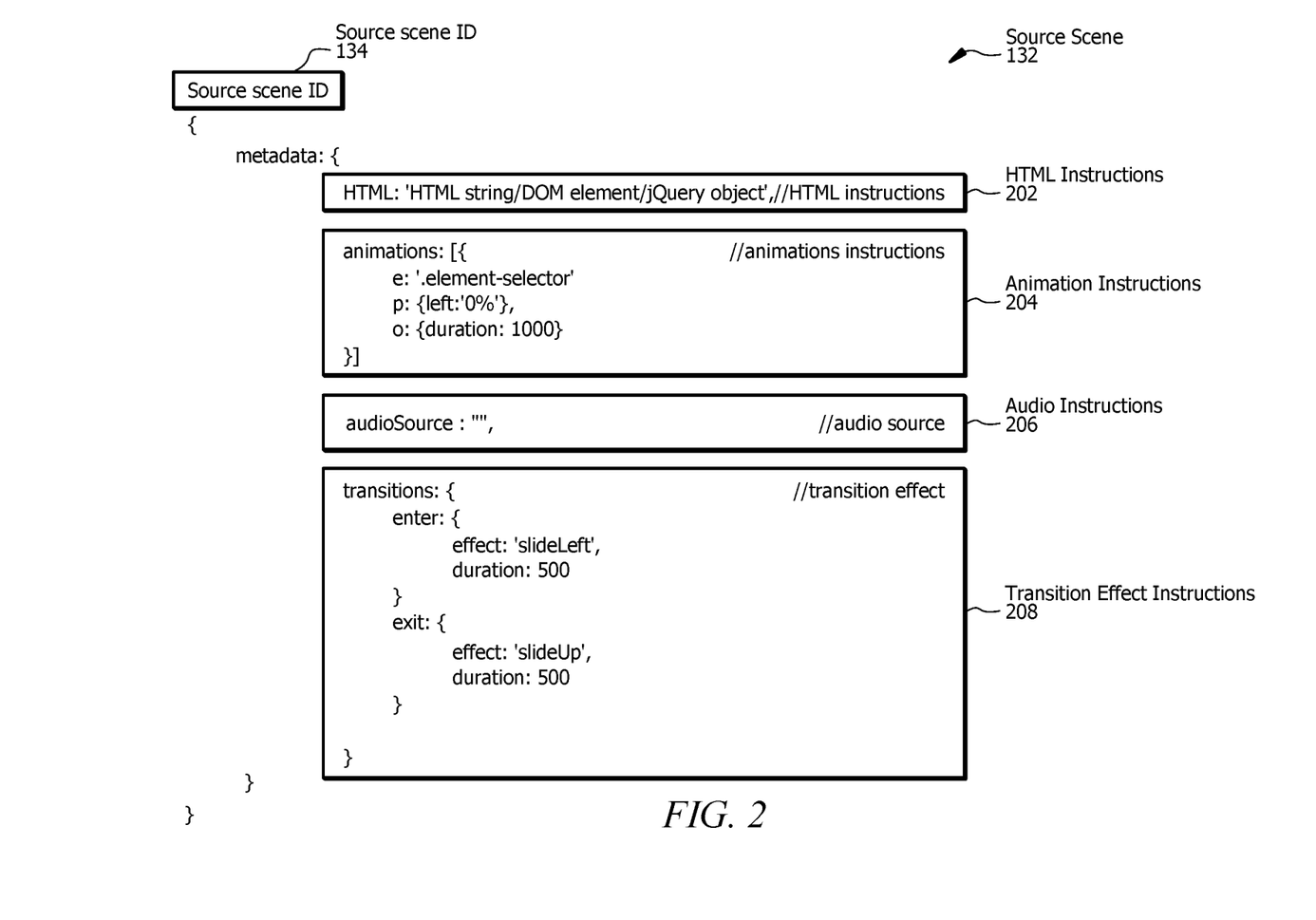
FIG. 2 is an embodiment of a source scene for an interactive video.
Figure 3:
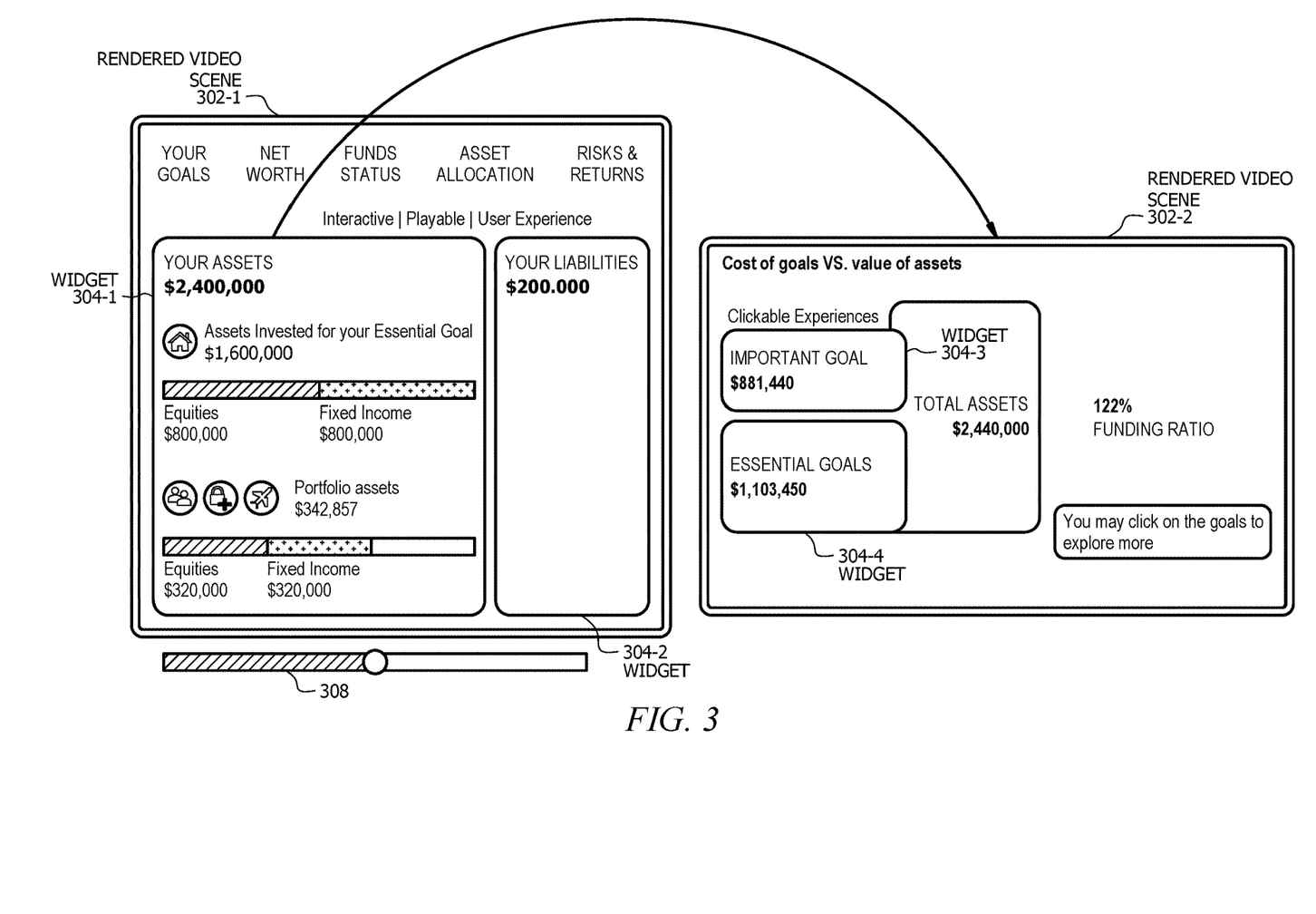
FIG. 3 is an embodiment of a rendered video scene of an interactive video.
Figure 4:
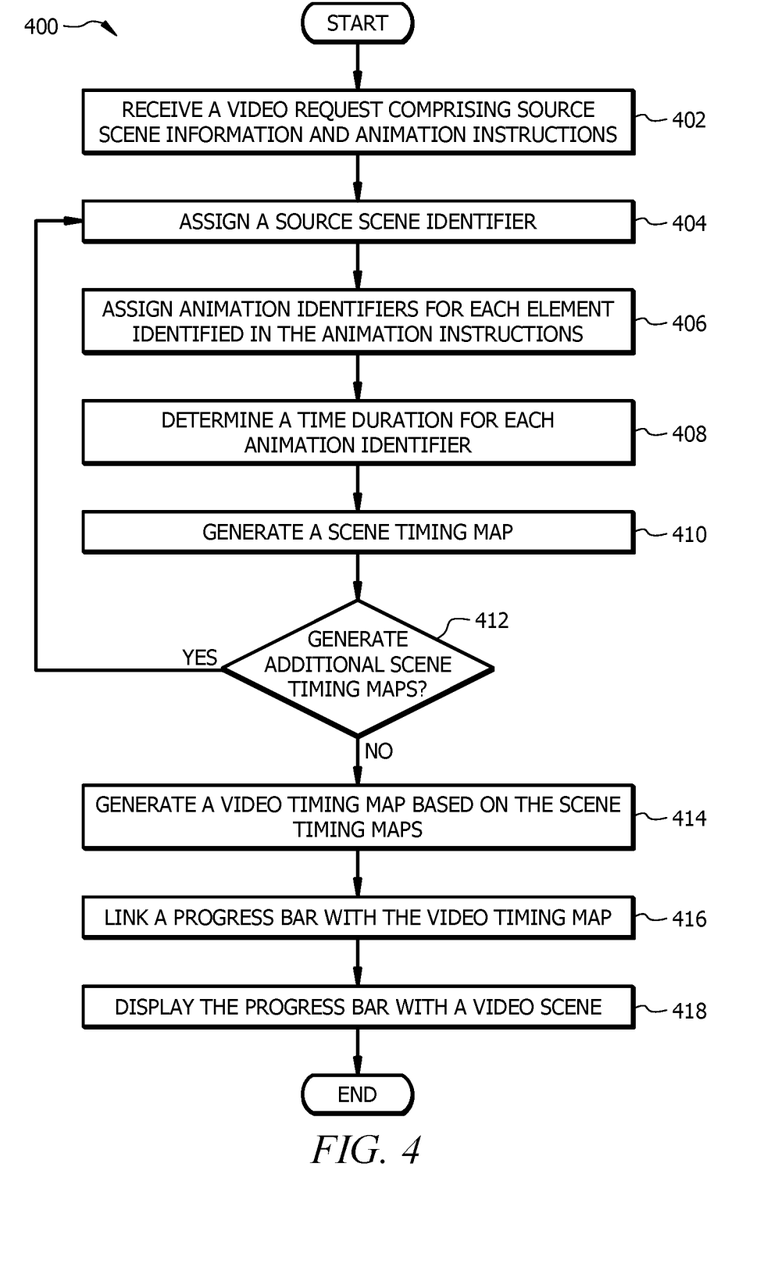
FIG. 4 is a flowchart of an embodiment of a progress bar generating method for an interactive video.
Figure 5:
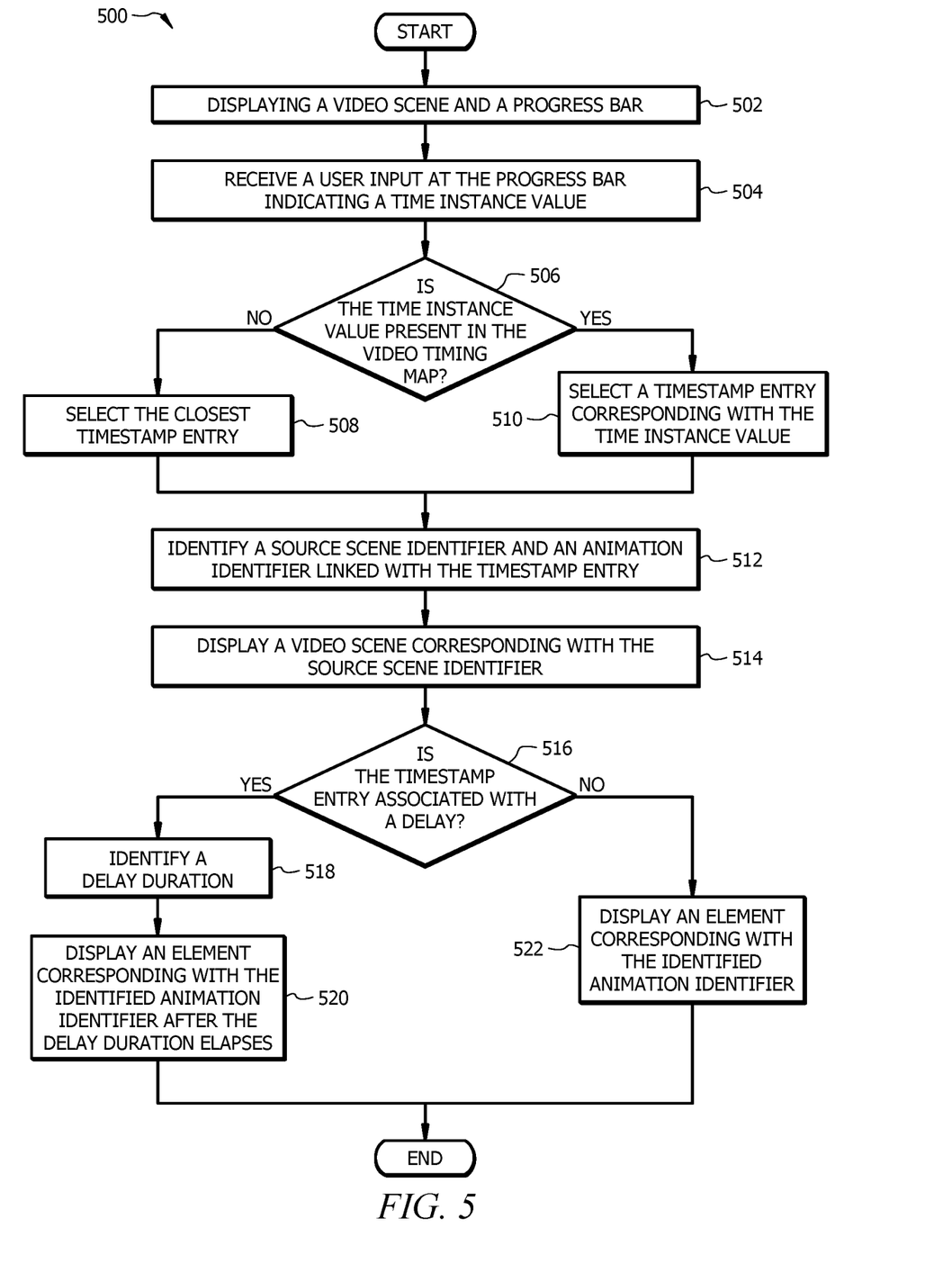
FIG. 5 is a flowchart of an embodiment of an interactive video synchronization method for an interactive video.
Figure 6:
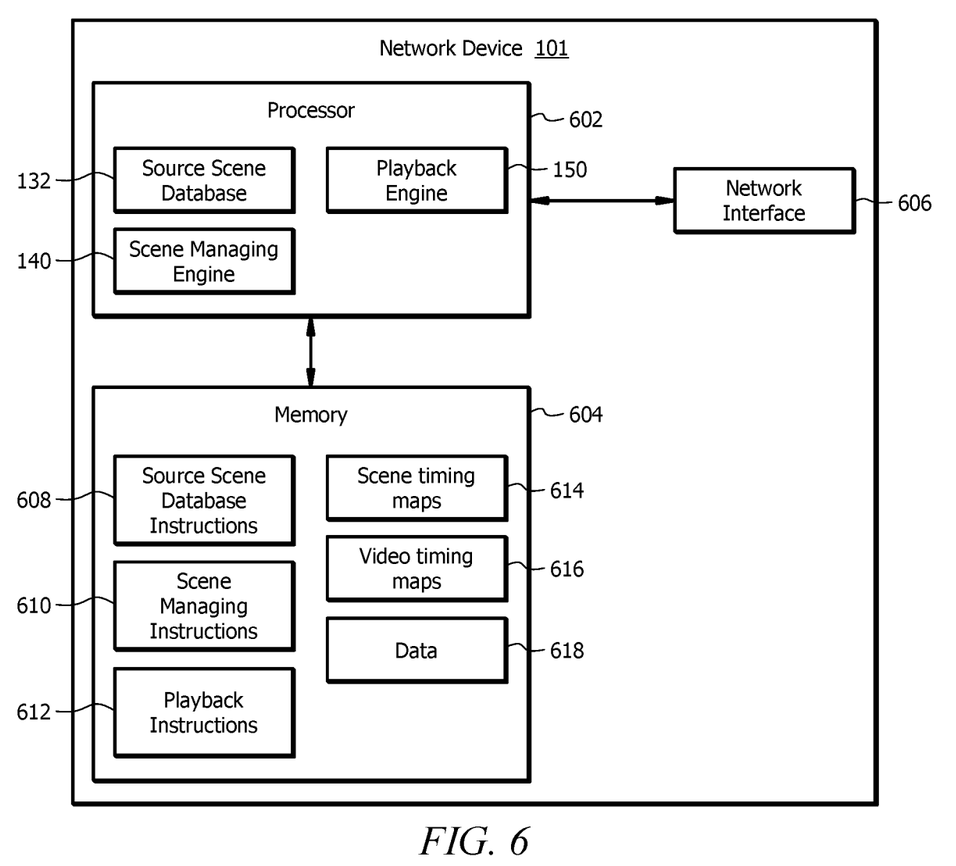
FIG. 6 is a schematic diagram of an embodiment of network device configured to create an interactive video using a markup language.

FIG. 1 is an example of an interactive video system configuration to generate interactive HTML videos. FIG. 2 is an example of a scene source for an interactive HTML video. FIG. 3 is an example of a rendering of a portion of an interactive HTML video. FIG. 4 is an example of a process for linking animations in an interactive HTML video with a progress bar. FIG. 5 is an example of a process for using a progress bar that is linked with animations in an interactive HTML video. FIG. 6 is an example of a network node configured to generate interactive HTML videos.

FIG. 1 is a schematic diagram of an embodiment of an interactive video system for creating interactive videos using a markup language according to the present disclosure. The system 100 comprises one or more network devices 101 in signal communication with one or more users 110 via a network 120. For example, a user 110 may employ a computer or mobile device (e.g. a smart phone) to communicate with the network node 101 using a network connection. The system 100 is generally configured to receive a video request 112 from a user 110, to retrieve a set of source scenes 132 from a source scene database 130, to generate video scenes 160 in the form of Hypertext Markup Language (HTML) pages using a scene managing engine 140, to include the video scenes 160 in a scene collection 170, and to process the scene collection 170 using a playback engine 150.

The network 120 is any suitable type of network operable to support communication between users and components (e.g. network nodes 101) of the system 100. The network 120 is configured to enable wired and/or wireless communications. For example, the network 120 may include all or a portion of the Internet, a public switched telephone network (PSTN), a public network, a private network, a local area network (LAN), a metropolitan area network (MAN), a wide area network (WAN), or any other suitable type of network. The network 120 may be configured to support any suitable type of communication protocol as would be appreciated by one of ordinary skill in the art upon viewing this disclosure.

The network node 101 comprises a source scene database 130, a scene managing engine 140, and a playback engine 150. In FIG. 1, the source scene database 130, the scene managing engine 140, and the playback engine 150 are shown as being implemented in a single network device 101. In other examples, the source scene database 130, the scene managing engine 140, and the playback engine 150 may be implemented by any suitable number of network nodes 101. Additional information about the network node 101 is described in FIG. 6.

Source Scene Database

The source scene database 130 is configured to store and maintain source scene 132 information. The source scene database 130 may be implemented by one or more processors or data storage devices (e.g., disks, solid-state drives). In FIG. 1, the source scene database 130 is shown as located within the network device 101. In some embodiments, the source scene database 130 may be a data storage device that is external to the network device 101. For example, the source scene database 130 may be a data storage device that is in signal communication with the network node 101.

Source scenes 132 include source code for the web content requested by users 110. For example, source scenes 132 may include source code for generating relevant web content such as, for example, stock information, account balance information for users 110, and instructions on how to conduct a trade, among others. In some embodiments, each source scene 132 includes a source scene identifier (ID) 134 and a set of instructions 136 comprising HTML instructions and animation instructions related to the web content. For example, referring to FIG. 2, a source scene 132 includes source scene ID 134, HTML instructions 202, and animation instructions 204. In some embodiments, the instructions 136 in the source scenes 132 are written in a format of JavaScript Object Notation (JSON). In alternative embodiments, the instructions 136 in the source scenes 132 may be written in any other suitable language or format.

The HTML instructions 202 in the source scenes 132 are used to generate HTML code for the web content associated with the source scenes 132. For example, the HTML instructions may include instructions 136 identifying the number and/or types of HTML elements that will be included in the generated HTML code. An HTML element may have a format of HTML string, a Document Object Model (DOM) element, jQuery object, or any other suitable format. The animation instructions 204 in the source scenes 132 are used to generate animations for the web content associated with the source scenes 132. For example, the animation instructions 204 may include instructions 136 identifying the number and/or types of animations that will be generated. In some embodiments, a source scene 132 further includes other instructions. For example, referring to FIG. 2, a source scene 132 may further include audio instructions 206 and/or transition effect instructions 208.

Scene Managing Engine

The scene managing engine 140 is configured to manage source scenes 132. The scene managing engine 140 comprises tools and libraries to support processing the source scenes 132. For example, scene managing engine 140 may be configured to retrieve source scenes 132 from source scene database 130 and to generate a video scene 160 for each of the retrieved source scenes 132 as described in greater detail below.

The scene managing engine 140 is configured to retrieve source scenes 132 from the source scene database 130. For example, the scene managing engine 140 receives a video request 112 from a user 110 which may include a set of source scene IDs 134 arranged in a pre-determined ordering specified by the user 110. For instance, the user 110 may want to generate a video for trading (e.g. sell or buy) a particular stock using the system 100. In this example, the user 110 may want to view past performance of the stock, check whether the user 110 has enough account balance to trade the stock, and watch a video on how to conduct a trade on the stock. The system 100 may provide the user 110 with the capabilities to select sources scenes 132 related to such information. For example, the user 110 may specify, in the video request 112, a first source scene ID 134 associated with a first source scene 132 about statistics of stocks, a second source scene ID 134 associated with a second source scene 132 about account balances of the user 110, and a third source scene ID 134 associated with a third source scene 132 about instructions on conducting a trade. The three source scene IDs 134 in the video request 112 may be arranged in a pre-determined ordering, such as in the order of the first source scene ID 134, the second source scene ID 134, and the third source scene ID 134. The scene managing engine 140 is configured to read the source scene IDs 134 in the video request 112 and to retrieve source scenes 132 associated with the source scene IDs 134 from the source scene database 130. The scene managing engine 140 identifies the source scenes 132 based on the source scene IDs 134 and retrieves the identified source scenes 132.

The scene managing engine 140 is further configured to generate video scenes 160 from the source scenes 132. The scene managing engine 140 generates a video scene 160 in the form of a web page written in a markup language. For example, the scene managing engine 140 may generate a video scene 160 in the form of an HTML page. In some embodiments, video scene 160 includes one or more interactive HTML elements 162, one or more animations 164, one or more audios 166, and one or more transition effects 168. The one or more interactive HTML elements 162 may have a format of a HTML string, a DOM element, a jQuery object, or any other suitable format. The animations 164 may have a format of JavaScript or any other suitable format. In some embodiments, the scene managing engine 140 generates the video scenes 160 from the source scenes 132 based on the instructions 136 in the sources scenes 132. For example, generation module 146 may use the HTML instructions 202 in the source scenes 136 to generate HTML code including the interactive HTML elements 162 and use the animation instructions 204 in the source scenes 136 to generate one or more animations 164 associated with the HTML code. In some embodiments, the animations 164 written in JavaScript are embedded in the HTML code generated from the HTML instructions 202. The scene managing engine 140 may be further configured to use the audio instructions 206 and transition effect instructions to generate audios 166 and transition effect 168 and insert them in the HTML code.

In some embodiments, one or more interactive HTML elements 162 are implemented as one or more widgets that allow users 110 to interactively view information in the video scenes 160. For example, a first video scene 160 may include a first HTML element 162 implemented as a first widget, which provides a drill-down capability such as a dropdown menu showing a list of stocks. Each stock in the dropdown menu, when clicked by the user 110, may show statistics such as historical performance of the stock. As another example, a second video scene 160 may include a second HTML element 162 implemented as a second widget, which provides a drilldown capability such as a dropdown menu showing a list of accounts owned by the user 110, such as a retirement account, a checking account, and an investment account, among others. Each account in the dropdown menu, when clicked by the user 110, may show account balance of the account. As another example, a third video scene 160 may include a third HTML element 162 implemented as a third widget, which provides a drilldown capability such as a dropdown menu showing a list of videos on instructions on conducting a trade on, stocks, equities, bonds, and mutual funds, among others. In this example, each video in the dropdown menu, when clicked by the user 110, may play a video on instructions on conducting a particular trade.

The video scenes 160 include interactive HTML elements 162 that allow users to interact with the video scenes 160. Allowing users 110 to interact with video scenes 160 increases the efficiency of the system 100 because the users 110 do not need to be redirected to different places (e.g., web pages) and bounce around to find and use the information they want. Instead, users 110 can stay on and interact with the video scenes 160 to find the information they want. By doing this, users 110 can avoid being redirected to multiple places and the system 100 can avoid reloading or rebuffering the same web pages or content. This reduces the response time of the system 100 and conserves computing resources, memories, and other network resources.

After generating video scenes 160 for all the source scenes 132, the scene managing engine 140 comprises the video scenes 160 into a scene collection 170. The video scenes 160 in the scene collection 170 are arranged in an ordering corresponding to the pre-determined ordering of the source scene IDs 134 specified in the video request 112. The scene managing engine 140 forwards the generated scene collection 170 to playback engine 150 for subsequent processing.

Playback Engine

Playback engine 150 is configured to process video scenes 160 in a scene collection 170. Playback engine 150 comprises tools and libraries to support creating an interactive video based on the video scenes 160 in the scene collection 170. The playback engine 150 is generally configured to receive a scene collection 170, to process the video scenes 160 in the scene collection 170, and to create an interactive video based on the video scenes 160.

In one embodiment, the playback engine 150 is configured to receive the scene collection 170 from the scene managing engine 140 and to process the video scenes 160 in the scene collection 170. For example, the playback engine 150 may map the video scenes 160 to a timeline. Specifically, the playback engine 150 may assign an animation ID to each of the animations 164 associated with each of the video scenes 160. In some embodiments, each animation 164 may include one or more frames. The playback engine 150 may further assign an animation ID to each of the frames in each of the animations 164. Then, the playback engine 150 maps the animation IDs to a pre-determined timeline. For example, the playback engine 150 may associate each animation ID with a time stamp in the predetermined timeline. In some embodiments, the pre-determined timeline is determined based on the pre-determined ordering of source scene IDs in the video request 112.

The playback engine 150 is further configured to render the video scenes 160 in the received scene collection 170. The playback engine 150 comprises tools and libraries to support parsing a markup language (e.g., HTML), analyzing elements in the markup language, and creating a formalized layout of the elements. For example, the playback engine 150 may be configured to parse the video scenes 160 in the form of an HTML page, to analyze the interactive HTML elements 162 in the HTML page, and to create a layout of the HTML page including some widgets implemented by the interactive HTML elements 162. For example, referring to FIG. 3, a first video scene 160 is rendered as a first rendered video scene 302-1 configured with two widgets 304, namely a first widget 304-1 and a second widget 304-2. The first widget 304-1 may be implementing a first interactive HTML element 162 of the first video scene 160, and the second widget 304-2 may be implementing a second interactive HTML element 162 of the video scene 160. As illustrated, the first widget 304-1 is configured to show assets of user 110 and the second widget 304-2 is configured to show liabilities of the user 110. When viewing a video including the rendered video scene 302-1, a user 110 can pause the interactive video at the video scene 302-1 and interact with any one of the two widgets 304. For example, the user 110 may click on an HTML link or an interactive HTML element in the widgets 304. The HTML link or the interactive HTML element in the widgets 304, when clicked or pressed, may present one or more web content items or performs one or more predetermined drill-down tasks. The two widgets 304 of rendered video scene 302-1 provide users 110 with drill-down capabilities to view additional information. For example, when the user 110 clicks on the first widget 304-1 showing assets of the user 110, the system 100 may display another rendered video scene 302-2 including another two widgets 304-3 and 304-4 that shows "important goal" and "essential goal" for the user 110, respectively. The two widgets 304-3 and 304-4 may further have drill-down capabilities that allow user 110 to click on the widgets 304 and explore additional information.

The playback engine 150 may be further configured to render the animations 164 associated with a video scene 160. The rendering engine 152 creates an interactive video by including the animations 164 in the rendered video scenes 160. The playback engine 150 is configured to play back the video generated based on the rendered scene collection 170. Playback engine 150 may be configured to map the timeline of the frames and/or the animations 164 to a progress bar 308 and to play the video for the user 110. An example of mapping animations 164 to a progress bar 308 is described in FIG. 4. An example of using the disclosed progress bar 308 is described in FIG. 5. The playback engine 150 plays the video in the form of a series of HTML pages while allowing users 110 to pause and interact with the interactive HTML elements 162 implemented as widgets 304 in the video. In this way, the system 100 provide users 110 with an interactive video experience with drilldown capabilities, which supports customization and personalization for individual users 110.

Video Generating Process

The following is a non-limiting example of the system 100 in operation. The system 100 receives a video request 112 from a user 110. Specifically, the scene managing engine 140 receives the video request 112 that comprises a set of source scene IDs 134. The source scene IDs 134 in the video request 112 are arranged in a pre-determined order specified by the user 110. Then, the scene managing engine 140 uses the source scene IDs 134 to retrieve the source scenes 132 corresponding to the source scene IDs 134 from the source scene database 130. Next, the scene managing engine 140 receives the source scenes 132 and generates a video scene 160 for each of the received source scenes 132. For example, the scene managing engine 140 may generate a video scene 160 in the form of an HTML page for each source scene 132. In some embodiments, the scene managing engine 140 generates the video scenes 160 from the source scenes 132 based on the instructions 136 in the sources scenes 132. For example, the scene managing engine 140 may use the HTML instructions 202 in the source scenes 136 to generate HTML code including one or more interactive HTML elements 162 and use the animation instructions 204 in the source scenes 136 to generate one or more animations 164 associated with the HTML code.

After generating video scenes 160 for each of the source scenes 132, the scene managing engine 140 includes the video scenes 160 in a scene collection 170. The video scenes 160 in the scene collection 170 are arranged in an ordering corresponding to the pre-determined ordering of the source scene IDs 134 specified in the video request 112. The scene managing engine 140 forwards the generated scene collection 170 to playback engine 150 for subsequent processing.

The playback engine 150 receives the scene collection 170 from the scene managing engine 140 and processes the video scenes 160 in the scene collection 170. For example, the playback engine 150 may map the video scenes 160 to a timeline. Specifically, the playback engine 150 may assign an animation ID to each of the animations 164 associated with each of the video scenes 160. In some embodiments, each animation 164 may include one or more frames. The playback engine 150 may further assign an animation ID to each of the frames in each of the animations 164. Then, the playback engine 150 maps the animation IDs to a pre-determined timeline. For example, the playback engine 150 may associated each animation ID with a time stamp in the pre-determined timeline. In some embodiments, the pre-determined timeline is determined based on the pre-determined ordering of source scene IDs in the video request 112.

Next, the playback engine 150 parses the video scenes 160 in the form of an HTML page, analyzes the interactive HTML elements 302 in the HTML page, and creates a layout of the HTML page including some widgets implemented by the interactive HTML elements 302. The playback engine 150 renders the animations 164 associated with the video scenes 160. In some embodiments, the playback engine 150 creates an interactive video by including the animations 164 in the rendered video scenes 302.

The playback engine 150 maps the timeline of the frames and/or the animations 164 of the rendered videos scenes 302 to a progress bar 308 and plays the video for the user 110. An example of a process for mapping video scenes 160 to a progress bar 308 is described in FIG. 4. The playback engine 150 may play the video while allowing users 110 to pause and interact with the interactive HTML elements 302 in each video scene 160 in the interactive video. In some embodiments, the interactive HTML elements 302 are implemented as widgets 304 that allow users 110 to interactively view information in the video scenes 160.

Progress Bar Generating Process

FIG. 4 is a flowchart of an embodiment of a progress bar generating method 400 for an interactive video. Unlike traditional videos where a progress bar has a one-to-one correspondence between time and video frames, an interactive HTML videos may comprise animations 164, delays, and interactive HTML elements that have different timing characteristics. These elements have variable timing characteristics because these elements may occur sequentially, in parallel, or may even be optional. These variable timing characteristics mean that interactive HTML videos do not follow a linear timeline or have one-to-one correspondence between time and video scenes. The playback engine 150 may employ method 400 to generate progress bar 308 for an interactive HTML video. The progress bar 308 provides a user interface that links video scenes 160 and other elements in an interactive HTML video.

At step 402, the playback engine 150 receives a video request comprising source scene information for a set of video scenes 160 (e.g. a scene collection 170) and animation instructions 204. An example of a video request is shown below in Table 1. The animation instructions 204 comprise a set of elements (e.g. animations 164, delays, and interactive HTML elements) and time durations linked with each element in the set of the elements. Referring to Table 1 as an example, the video request comprises information for two video scenes 160. The first scene comprises three elements (shown as "elem1," "elem2," and "elem3"). The first element is linked with a time duration of 1000 milliseconds (ms). The time duration indicates how long the element takes to finish execution. The second element is linked with a time duration of 2000 ms and a delay of 1000 ms. The delay indicates the length of time for a waiting period before executing an element. The third element is linked with a time duration of 3000 ms. In this example, the time durations and delays are in units of milliseconds. In other examples, the time durations and delays may be in any other suitable units. Similarly, the second video scene 160 comprises three elements (shown as "elem4," "elem5," and "elem6"). The animation instructions 204 may further comprise properties or any other suitable type of information related to the elements. In some embodiments, the animation instructions 204 may comprise audio instructions 206 and/or transition effect instructions 208.

associate the first video scene 160 with a source scene ID 134 of "sId1" and the second video scene 160 with a source scene ID 134 of "sId2." In other examples, the playback engine 150 may use any suitable type of identifier for identifying the video scenes 160 in the set of video scenes 160.

At step 406, the playback engine 150 assigns animation IDs for each element identified in the animation instructions. Here, the playback engine 150 assigns animation IDs that identify one or more elements. Referring to Table 1, the playback engine 150 may assign the first element "elem1" with animation ID of one. The playback engine 150 may also assign animation IDs to delays that are associated with an element. For example, the playback engine 150 may assign an animation ID to the delay that is linked with the second element "elem2." In other examples, the playback engine 150 may use any suitable type of identifier for identifying the elements. An example of using animation IDs is shown below in Table 2.

At step 408, the playback engine 150 determines a time duration for each animation ID. Referring to Table 1, the playback engine 150 may use the time durations linked with an element as the time duration for the corresponding animation ID. For example, the playback engine 150 may determine that the time duration for the animation ID linked with first element "elem1" is 1000 ms, the time duration for the animation ID linked with the second element "elem2" is 2000 ms, the time duration for the animation ID linked with the delay for the second element is 1000 ms, and so on.

In some embodiment, the animation instructions 204 may indicate that one or more of elements are configured to run in parallel. For example, the animation instructions 204 may comprise a flag that indicates when elements are configured to run in parallel. In this example, the playback engine 150 may determine which element has the largest time duration and may use this time duration as the time duration for the animation ID linked with the elements running in parallel. For instance, the playback engine 150 may determine that a first element and a second element are configured to run in

TABLE 1

Example of a video request

```
{
    "metadata": {
        "html": "html",
        "animations": [
            { "e": ".elem1", "p": { "left": "10%"}, "o": {"duration": 1000}},
            { "e": ".elem2", "p": { "scale": 2 }, "o": {"duration": 2000, "delay" : 1000}},
            { "e": ".elem3", "p": { "left": "0%"}, "o": {"duration": 3000}},
        ]
    }
},
{
    "metadata": {
        "html": "html",
        "animations": [
            { "e": ".elem4", "p": { "left": "10%"}, "o": {"duration": 1000}},
            { "e": ".elem5", "p": { "scale": 2 }, "o": {"duration": 2000}},
            { "e": ".elem6", "p": { "left": "0%"}, "o": {"duration": 3000, "delay" : 500}},
        ]
    }
}
```

At step 404, the playback engine 150 assign or determines a source scene ID 134 for a video scene 160. Here, the playback engine 150 assigns source scene IDs 134 that uniquely identify each video scene 160 in the set of video scenes 160. For example, the playback engine 150 may parallel in response to identifying a flag in the animation instructions 204. The first element is linked with a time delay of 1000 ms and the second element is linked with a time duration of 2000 ms. In this example, the playback engine 150 will use the time duration of 2000 ms for the animation ID linked with the first element and the second element running in parallel. This process takes into account that the first element and the second element are running in parallel and not sequentially.

At step 410, the playback engine 150 generates a scene timing map. An example of a scene timing map is shown below in Table 2. The scene timing map is configured to link source scene IDs 134 with animation ID and their corresponding time durations. Referring to Table 2 as an example, the playback engine 150 links the source scene ID 134 for the first video scene 160 with the animation IDs for the first element, the second element, the third element, and their delays. In this example, an animation ID with a value of one is linked with the first element "elem1." An animation ID with a value of two is linked with a first portion of the delay associated with the second element "elem2" and an animation ID with a value of three is linked with a second portion of the delay associated with the second element "elem2." An animation ID with a value of four is linked with the second element "elem2." An animation ID with a value of five is linked with the third element "elem3." Each animation ID is linked with its corresponding time duration that was determined in step 408. The process of linking source scene IDs 134 with animation IDs and their corresponding time durations is repeated for every video scene 160. The scene timing map may further comprise a start time value associated with each video scene 160 or any other information.

video timing map comprises timestamp entries with values of 0, 2, 3, 4, 8, 14, 16, 20, and 21. In this example, the value of the timestamp entry corresponds with a multiplier value for time units of 500 ms. For instance, a timestamp entry value of two corresponds with 1000 ms or 1 second. A timestamp entry value of four corresponds with 2000 ms or 2 seconds. In other examples, the timestamp entry value may represent an instance in time. In some embodiments, the timestamp entry value may be a unit of time. Each timestamp entry is linked with a source scene ID 134 and an animation ID. For example, the first timestamp entry (shown as "t": 0) references the first source scene ID 134 (shown as "sId": 1) and the first animation ID (shown as "aId": 1), the second timestamp entry (shown as "t": 1) references the second source scene ID 134 (shown as "sId": 2) and the first animation ID (shown as "aId": 2), and so on. The video timing map may further comprise a total time for executing or presenting the interactive video or any other information associated with the interactive video.

TABLE 3

Example of a video timing map

{
  "map": [
    { "t": 0, "d": { "sId": 1, "aId": 1}},

TABLE 2

Example of a scene timing map

{
  "sId": 1,
  "startTime": 0,
  "animations": [
    { "aId": 1, "e": ".elem1", "p": { "left": "10%"}, "o": {"duration": 1000}},
    { "aId": 2, "da": 1, "o": {"duration": 500}},
    { "aId": 3, "da": 1, "o": {duration: 500}},
    { "aId": 4, "e": ".elem2", "p": { "scale": 2 }, "o": {"duration": 2000, "delay" : 1000}},
    { "aId": 5, "e": ".elem3", "p": { "left": "0%"}, "o": {"duration": 3000}},
    ]
  }
},
{
  "sId": 2,
  "startTime": 7000,
  "animations": [
    { "aId": 6, "e": ".elem4", "p": { "left": "10%"}, "o": {"duration": 1000}},
    { "aId": 7, "e": ".elem5", "p": { "scale": 2 }, "o": {"duration": 2000}},
    { "aId": 8, "da": 1, "o": {"duration": 500}},
    { "aId": 5, "e": ".elem6", "p": { "left": "0%"}, "o": {"duration": 3000}}, "delay" 500}},
    ]
  }
}

At step 412, the playback engine 150 determines whether to generate additional scene timing maps. For example, the playback engine 150 may determine whether there any more video scenes 160 in the video request that need to be processed and added to the scene timing map. The playback engine 150 returns to step 404 in response to determining to generate another scene timing map. The playback engine 150 proceeds to step 414 in response to determining not to generate additional scene timing maps.

At step 414, the playback engine 150 generates a video timing map based on the scene timing maps. An example of a video timing map is shown below in Table 3. The video timing map comprises a set of timestamp entries that each reference a source scene ID 134 and an animation ID in the scene timing map. Referring to Table 3 as an example, the TABLE 3-continued Example of a video timing map     { "t": 2, "d": { "sId": 1, "aId": 2}},
    { "t": 3, "d": { "sId": 1, "aId": 3}},
    { "t": 4, "d": { "sId": 1, "aId": 4}},
    { "t": 8, "d": { "sId": 1, "aId": 5}},
    { "t": 14, "d": { "sId": 2, "aId": 6}},
    { "t": 16, "d": { "sId": 2, "aId": 7}},
    { "t": 20, "d": { "sId": 2, "aId": 8}},
    { "t": 21, "d": { "sId": 2, "aId": 9}},
  ],
  "totalTime": 14300
}

At step 416, the playback engine 150 links a progress bar 308 with the video timing map. The progress bar 308 is a user interface that allows the user to select time instances within the interactive video. In one embodiment, the progress bar 308 is a slider bar. In other embodiments, the progress bar 308 may be represented using any other suitable representation as would be appreciated by one of ordinary skill.

At step 418, the playback engine 150 displays the progress bar 308 with a video scene 160 from the interactive video. An example of displaying a progress bar 308 with a video scene 160 is shown in FIG. 3. An example of a using the progress bar 308 to display a particular portion of the interactive video is described in FIG. 5.

In one embodiment, the interactive HTML video may comprise one or more interactive HTML elements that are embedded in a video scene. A video scene 160 may have a button, a slider, shortcut, or any other suitable type of interactive HTML element embedded in a video scene 160. For example, a video scene 160 may comprise a button that triggers the playback engine 150 to provide web content when the button is pressed by a user 110. In other examples, interactive HTML elements may be configured to trigger any other actions to be performed by the playback engine 150. In one embodiment, the playback engine 150 is configured to pause the progression of the progress bar 308 when the interactive HTML element is activated (e.g. pressed or manipulated) by a user 110. For example, the playback engine 150 may suspend the progression of a progress bar 308 when a user 110 presses an interactive HTML element to access web content and may resume the progression of the progress bar 308 when the user 110 returns the original video scene.

Progress Bar Operation Process

FIG. 5 is a flowchart of an embodiment of an interactive video synchronization method 500 for an interactive video. As discussed above, interactive HTML videos do not follow a linear timeline or have one-to-one correspondence between time and video scenes because of their variable timing characteristics. The playback engine 150 may employ method 500 to synchronize video scenes in an interactive HTML video.

At step 502, the playback engine 150 displays a video scene 160 from an interactive video and a progress bar 308. For example, the playback engine 150 may generate an interactive HTML video and a progress bar 308 using the techniques previously described. For instance, the playback engine 150 may use a process similar to the process described in FIG. 5 for generating an interactive HTML video and progress bar 308.

At step 504, the playback engine 150 receive a user input at the progress bar 308 that indicates a time instance value. For example, the progress bar 308 may be represented as a slide bar and a user 110 may use a cursor on the slide bar to indicate a time instance value. In other examples, a user 110 may use any other suitable technique for indicating a time instance value.

At step 506, the playback engine 150 determines whether the time instance value is present in the video timing map. The playback engine 150 compares the indicated time instance value to the timestamp entries in the video timing map to determine whether the time instance value matches any of the timestamp entries. The playback engine 150 proceeds to step 508 in response to determining that the time instance value is not present in the video timing map. The playback engine 150 proceeds to step 510 in response to determining that the time instance value is present in the video timing map.

At step 508, the playback engine 150 selects the closest timestamp entry in the video timing map. Here, the playback engine 150 selects the timestamp entry that closest matches the indicated time instance value. In one embodiment, the playback engine 150 selects a timestamp entry that immediately precedes the indicated time instance value when the time instance value is not present in the video timing map. Referring to Table 3 as an example, the playback engine 150 may receive a time instance value of ten and may select the timestamp entry with a value of eight as the closest timestamp entry.

Returning to step 506, the playback engine 150 proceeds to step 510 in response to determining that the time instance value is present in the video timing map. At step 510, the playback engine 150 selects a timestamp entry corresponding with the time instance value.

At step 512, the playback engine 150 identifies a source scene ID 134 and an animation ID linked with the selected time stamp entry. Referring to Table 3 as an example, the playback engine 150 may select a timestamp entry with a value of eight and may identify the source scene ID 134 (shown as "sId": 1) and the animation ID (shown as "aId": 5) linked with the selected timestamp entry. The source scene ID 134 and the animation ID are used to reference entries and information in a scene timing map. Continuing with the previous example, the playback engine 150 may use the identified source scene ID 134 and the animation ID to determine which video scene 160 and element to display. In addition, the playback engine 150 may use the identified source scene ID 134 and the animation ID to identify other information related to the video scene 160 and element such as a properties and time durations. At step 514, the playback engine 150 displays a video scene 160 from the interactive HTML video that corresponds with the source scene ID 134.

At step 516, the playback engine 150 determines whether the timestamp entry is associated with a delay. The playback engine 150 may use the identified source scene ID 134 and the animation ID with the scene timing map to determine whether the timestamp entry corresponds with a delay. Referring to Table 3 as an example, the timestamp entry linked with the first source scene ID 134 (shown as "sId": 1) and the second animation ID (shown as "aId": 2) is associated with a delay having a time duration of 500 ms. As another example, the timestamp entry linked with the first source scene ID 134 (shown as "sId": 1) and the fourth animation ID (shown as "aId": 4) is not associated with a delay. The playback engine 150 proceeds to step 518 in response to determining that the timestamp entry is associated with a delay. The playback engine 150 proceeds to step 522 in response to determining that the timestamp entry is not associated with a delay.

At step 518, the playback engine 150 identifies a delay duration. The delay duration is equal to the time duration that is linked with the delay in the scene timing map. Referring to Table 3 as an example, the delay duration associated with the first source scene ID 134 (shown as "sId": 1) and the second animation ID (shown as "aId": 2) is 500 ms.

At step 520, the playback engine 150 displays an element corresponding with the identified animation ID after the delay duration elapses. For example, the playback engine 150 may first display the video scene 160 identified by the source scene ID 134 and then wait for an amount of time equal to the delay duration to elapse before displaying the element corresponding with the animation ID.

Returning to step 516, the playback engine 150 proceeds to step 522 in response to determining that the timestamp entry is not associated with a delay. At step 522, the playback engine 150 displays an element corresponding with the identified animation ID. In this example, the playback engine 150 may display the element without waiting a predetermined amount of time after displaying the video scene 160 corresponding with the source scene ID 134.

FIG. 6 is a schematic diagram of an embodiment of network device 101 configured to create an interactive video using a markup language. The network node 101 comprises a processor 602, a memory 604, and a network interface 606. The network interface 101 may be configured as shown or in any other suitable configuration.

The processor 602 comprises one or more processors operably coupled to the memory 604. The processor 602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 604. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a source scene database 130, a scene managing engine 140, and a playback engine 150. In this way, processor 602 may be a special purpose computer designed to implement function disclosed herein. In an embodiment, the source scene database 130, the scene managing engine 140, and the playback engine 150 are each implemented using logic units, FPGAs, ASICs, DSPs, or any other suitable hardware.

The source scene database 130, the scene managing engine 140, and the playback engine 150 are configured similar to the source scene database 130, the scene managing engine 140, and the playback engine 150 described in FIG. 1, respectively.

The memory 604 comprises one or more disks, tape drives, or solid-state drives, and may be used as an over-flow data storage device, to store programs when such programs are selected for execution, and to store instructions and data that are read during program execution. The memory 604 may be volatile or non-volatile and may comprise read-only memory (ROM), random-access memory (RAM), ternary content-addressable memory (TCAM), dynamic random-access memory (DRAM), and static random-access memory (SRAM). The memory 604 is operable to store source scene database instructions 608, scene managing instructions 610, playback instructions 612, scene timing maps 614, video timing maps 616, data 618, and/or any other data or instructions. The source scene database instructions 608, the scene managing instructions 610, and the playback instructions 612 may comprise any suitable set of instructions, logic, rules, or code operable to execute the source scene database 130, the scene managing engine 140, and the playback engine 150, respectively. The scene timing maps 614 and the video timing maps 616 are the same as the scene timing maps and the video timing maps described in FIGS. 4 and 5. Data 618 may comprise source scenes 132, scene collections 170, video scenes 160, HTML elements 162, animations 164, audio 166, transition effects 168, text files, documents, images, video files, or any other suitable type of data.

The network interface 606 is configured to enable wired and/or wireless communications. The network interface 606 is configured to communicate data between network nodes 101 in the system 100 and/or any other system or domain. For example, the network interface 606 may comprise a WIFI interface, a local area network (LAN) interface, a wide area network (WAN) interface, a modem, a switch, or a router. The processor 602 is configured to send and receive data using the network interface 606. The network interface 606 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An interactive video playing method, comprising:
   displaying, by a playback engine implemented by a processor, a first video scene and a progress bar, wherein:
      the first video scene is in the form of a Hypertext Markup Language (HTML) page;
      the progress bar is linked with a video timing map comprising a set of timestamp entries; and
      each timestamp entry references a source scene identifier and an animation identifier;
   receiving, by the playback engine, a user input at the progress bar indicating a time instance value;

identifying, by the playback engine, a timestamp entry in a video timing map based on the indicated time instance value;

identifying, by the playback engine, a source scene identifier and an animation identifier corresponding with the timestamp entry;

displaying, by the playback engine, a second video scene corresponding with the source scene identifier; and displaying, by the playback engine, an element corresponding with the animation identifier.

2. The method of claim 1, further comprising:

determining, by the playback engine, the timestamp entry is linked with a delay; and identifying, by the playback engine, a delay duration for the delay; and wherein displaying the element corresponding with the animation identifier is performed after the delay duration has elapsed.

3. The method of claim 1, wherein identifying the timestamp entry comprises:

determining that the indicated time instance value is not present in the video timing map; and selecting a timestamp entry that precedes the indicated time instance value as the identified timestamp entry.

4. The method of claim 1, wherein identifying the timestamp entry comprises:

determining that the indicated time instance value is not present in the video timing map; and selecting the closest timestamp entry as the identified timestamp entry.

5. The method of claim 1, wherein the animation identifier identifies an interactive HTML element and time duration.

6. The method of claim 1, wherein displaying the video scene comprises displaying an interactive HTML element embedded in the video scene.

7. An interactive video playing device, comprising:

an interface configured to receive user input at a progress bar indicating a time instance value; and a playback engine implemented by a processor operably coupled to the network interface, configured to:

display a first video scene and the progress bar, wherein:

the first video scene is in the form of a Hypertext Markup Language (HTML) page;

the progress bar is linked with a video timing map comprising a set of timestamp entries; and each timestamp entry references a source scene identifier and an animation identifier;

identify a timestamp entry in a video timing map based on the indicated time instance value;

identify a source scene identifier and an animation identifier corresponding with the timestamp entry;

display a second video scene corresponding with the source scene identifier; and display an element corresponding with the animation identifier.

8. The device of claim 7, wherein the playback engine is further configured to:

determine the timestamp entry is linked with a delay; and identify a delay duration for the delay; and wherein displaying the element corresponding with the animation identifier is performed after the delay duration has elapsed.

9. The device of claim 7, wherein identifying the timestamp entry comprises:

determining that the indicated time instance value is not present in the video timing map; and selecting a timestamp entry that precedes the indicated time instance value as the identified timestamp entry.

10. The device of claim 7, wherein identifying the timestamp entry comprises:

determining that the indicated time instance value is not present in the video timing map; and selecting the closest timestamp entry as the identified timestamp entry.

11. The device of claim 7, wherein the animation identifier identifies an interactive HTML element and time duration.

12. The device of claim 7, wherein displaying the video scene comprises displaying an interactive HTML element embedded in the video scene.

* * * * *